F. L. WEST.
CONNECTING AND RETAINING DEVICE.
APPLICATION FILED APR. 28, 1917.
1,239,993.
Patented Sept. 11, 1917.
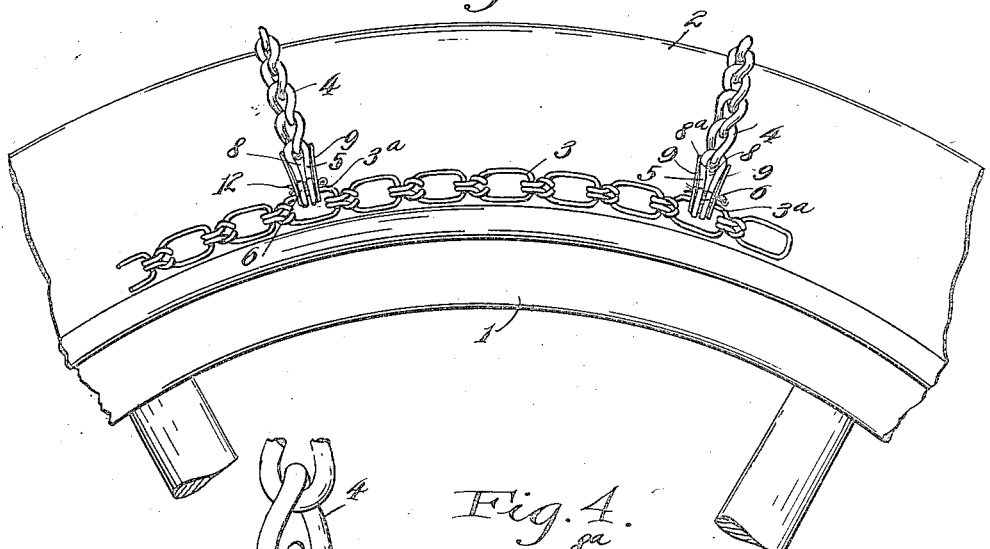
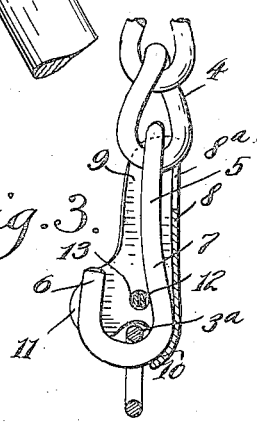
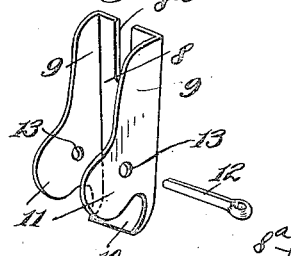
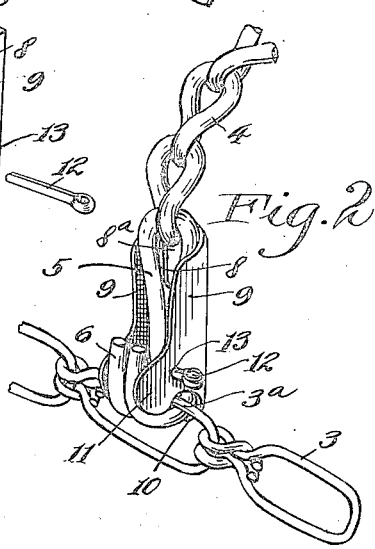
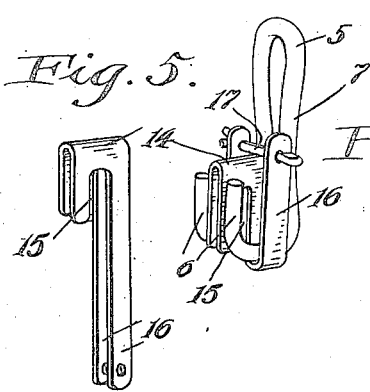
Inventor.
Frank L. West.

UNITED STATES PATENT OFFICE.

FRANK L. WEST, OF CLEVELAND HEIGHTS, OHIO.

CONNECTING AND RETAINING DEVICE.

1,239,993.     Specification of Letters Patent.     Patented Sept. 11, 1917.

Application filed April 28, 1917. Serial No. 165,084.

*To all whom it may concern:*

Be it known that I, FRANK L. WEST, a citizen of the United States, residing at Cleveland Heights, in the county of Cuyahoga and State of Ohio, have invented a certain new and useful Improvement in Connecting and Retaining Devices, of which the following is a full, clear, and exact description, reference being had to the accompanying drawings.

This invention relates to a means for detachably connecting articles, such as hooks, to coöperating members, and has for its general object to provide a simple and effective means for maintaining such connection when once made, as well as a means whereby the connected parts may be conveniently connected and disconnected as occasion may require. More limitedly, my invention comprises a connecting member in the shape of a hook together with a keeper associated with and connected to the hook in such manner as will enable the hook to be applied conveniently to a link (or other object) and to prevent disengagement of the hook from such coöperating member under all ordinary incidents of use. In the embodiment of my invention disclosed herein, the connection is shown as applied to the hooks of the cross members or links forming parts of chains which are applied to vehicle tires for the purpose of securing traction between the same and the roadway.

In the drawings forming a part hereof, Figure 1 represents a side elevation of a portion of a vehicle wheel having a tire chain applied thereto, the crossmembers being connected to the side chains in accordance with my invention; Fig. 2 represents a detail in perspective of a portion of one of the side chains and the coöperating portion of one of the crossmembers or links; Fig. 3 a central longitudinal sectional view through the keeper shown in Fig. 2, the hook appearing in elevation; Fig. 4 a detail in perspective of the keeper which is applied to the said hooks; Fig. 5 a detail in perspective of a modified form of keeper, showing the position of the side members thereof before applying the keeper to the hook; and Fig. 6 a detail in perspective showing the keeper applied to the hook.

Describing by reference characters the various parts illustrated therein, 1 denotes the felly and 2 the tire of a vehicle wheel. Applied to the tire is a chain comprising the side members 3 and the cross members or links 4. Each of the cross members is shown as a chain section each end whereof terminates in a hook. Each hook may be conveniently formed by bending a wire, preferably of the same gage, or diameter of stock as the links, into the shape of a loop, the ends of the wire being recurved so as to form a hook. The base 5 of the hook is of horseshoe shape, the branches being bent toward each other so that the recurved ends 6 will be in comparatively close proximity. In forming the hook, each branch will be provided with an incline 7 connecting the base portion thereof with the hook portion proper.

Each cross member 4 may be connected to the appropriate links of the side members or chains 3 by inserting the ends of the hooks thereinto. In order to prevent disengagement between the cross members and the side members, I have provided each of the hooks with a keeper. This keeper comprises generally a sheet metal member having a base 8 which is generally tapered in the direction of its length. Projecting from each side of the base is a side wall 9, the side walls being of sufficient depth to receive the hook base therewithin and projecting beyond such base a sufficient distance to be bent inwardly by a suitable tool, thereby to form a means for retaining the base of the hook within the keeper. The keeper base 8 is extended beyond the sides 9 and is preferably curved, as indicated at 10, to correspond to the curvature of the recurved portions of the ends 6 at this point. The sides 9 adjacent to the extension 10 are elongated, as shown at 11, whereby they embrace the recurved ends 6, the extensions being so located as to provide a space with the bottoms of the hooks for the reception of one of the sides 3ª of a side-chain link.

As will appear from Figs. 2 and 4, the base 8 is recessed, as indicated at 8ª, to accommodate the movement of the adjacent link of the crossmember.

In applying the crossmember to the side members, the hooks may be connected to the links of the side members in the ordinary manner. The keeper will then be applied to each of said hooks by slipping the same over and along the hook base with the projections 11 in operative relation to the recurved ends 6. A cotter pin 12 will then be inserted through the openings 13, the openings being located sufficiently close to the base 8 to cause the cotter pin to bear against the side branches of said base. The ends of the cotter pin will then be sprung apart in the ordinary manner and the keeper will thus be locked in place, after which the sides 9 may be bent inwardly and about said branches, if desirable.

When the parts have been thus connected, the keeper will be held in operative relation to the hook and to the coöperating link of the side chain. Longitudinal movement of the keeper with reference to the hook will be prevented by the projection 10 and by the engagement of the tapered sides 9 with the branches of the hook base; also by the engagement of the cotter pin with the inclines 7 on said branches. Furthermore, any pivotal movement of the keeper about the cotter pin will ordinarily be prevented by the engagement of the base of the keeper with the tire. This action will also be resisted by reason of bending inwardly the ends of the sides 9. As it is contemplated that the metal of which the keeper is formed will be resilient, in case the tire is deflated or in case one end of the cross chain is disconnected, a connection may be made without removing the keeper. By applying sufficient pressure to the keeper, the sides will spring out and the keeper may be rotated about the cotter pin until the projections 11 clear the recurved ends 6 and provide therewith a space sufficient to receive the side chain link. Thereafter the parts may be locked together by rocking the keeper back into its former position and, if necessary, bending the edges of the sides 9 toward each other.

Figs. 5 and 6 show a modification of my invention wherein the keeper is provided with a central projection 14 of doubled metal. This projection is slotted, as shown at 15, to receive the side of the coöperating link. In practice, the keeper will first be made in the shape shown in Fig. 5. This will enable it to be applied between the recurving ends 6. After having been so inserted, with the side of a link in the slots 15, the legs 16 may be bent upwardly and outwardly and then connected, above the projection 14, by means of a cotter pin 17.

While I have illustrated and shown my invention as applied to a connection between the cross members and side members of what are known to the trade as "tire chains" it will be understood that my invention is not thereby limited in its field of applicability. For instance, it may be employed as a means for connecting the ends of the side members of said chains; and it will be evident that the invention is also capable of use in other relations.

Having thus described my invention what I claim is:

1. The combination, with a double branched hook, comprising a base and recurved ends, of a keeper comprising a base having side projections extending therefrom adapted to receive therebetween the recurved ends of the hook and spaced from the bottom of the hook proper, and means for securing the said keeper to said hook.

2. The combination, with a double branched hook comprising a base and recurved portions, of a keeper comprising a base coöperating with the base of said hook and having a projection extending therefrom in operative relation to the recurved portions of said hook, and means for securing said keeper to said hook.

3. The combination, with a hook comprising a base and a recurved portion, of a keeper comprising a base coöperating with the base of said hook and having a projection extending therefrom, and means for securing said keeper to said hook with the said projection in operative relation to the recurved end of said hook.

4. The combination, with a double branched hook comprising a base and recurved end portions, of a keeper having a base provided with sides adapted to receive therebetween the base of said hook, said keeper having extensions coöperating with the recurved ends of said hook to provide a retaining means therewith for a member to which the hook may be applied, and a pin connecting the sides of said keeper and adapted to engage the base of said hook.

5. The combination, with a hook comprising a base and a recurved end, of a keeper having a base provide with sides adapted to receive therebetween the base of said hook, said keeper having extensions coöperating with the recurved end of said hook to provide a retaining means therewith, and means connecting the sides of said keeper.

6. The combination, with a double branched hook comprising a base and recurved end portions, of a keeper having a base provided with sides projecting therefrom, said sides being provided with extensions coöperating with the recurved ends of the hook to provide therewith retaining means for an article in the bottom of the hook, the base of the hook being inclined from such recurved portions, and a cotter pin extending through said sides and adapted to engage the inclined portions of said hook base.

7. The combination, with a hook comprising a base and a recurved end portion, of a keeper having a base provided with sides projecting therefrom, said sides being provided with extensions coöperating with the recurved end of the hook to provide therewith retaining means for an article in the bottom of the hook, the base of the hook being inclined from such recurved portion, and a pin extending through said sides and adapted to engage the inclined portion of said hook base.

8. The combination, with a double branched hook comprising a base and recurved end portions, the base of the hook diminishing in width from the loop thereof toward the recurved portions, of a keeper having a base diminishing in width in the same direction as the hook base and provided with resilient sides adapted to receive the hook base, said keeper being provided with lateral extensions coöperating with the recurved portions of the hook to provide therewith and with the bottom of the hook a closure for the article coöperating with the hook, and a pin connectiong the sides of said keeper and serving to retain the hook base therewithin, the base of said keeper having a curved portion coöperating with the bottom portion of the hook.

9. The combination with a double branched hook comprising a base and recurved end portions, the base of the hook diminishing in width from the loop thereof toward the recurved portions, of a keeper having a base diminishing in width in the same direction as the hook base and provided with resilient sides adapted to receive the hook base, said keeper being provided with lateral extensions coöperating with the recurved portions of the hook to provide therewith and with the bottom of the hook a closure for the article coöperating with the hook and a pin connecting the sides of said keeper and having a curved portion coöperating with the bottom portion of the hook, the base of said keeper being recessed at the end opposite the last mentioned projection.

10. The combination with a hook comprising a base and a recurved end, the base of the hook diminishing in width toward the recurved portion thereof, of a keeper having a base diminishing in width in the same direction as the hook base and provided with resilient sides adapted to receive the hook base, said keeper being provided with lateral extensions coöperating with the recurved portion of the hook to provide therewith and with the bottom of the hook a closure for the article coöperating with the hook, and a pin connecting the sides of said keeper.

11. The combination, with a double branched hook comprising a base and recurved end portions of a keeper having an extension coöperating with the recurved ends of the hook to provide therewith and with the bottom of the hook a retaining means for the article to which the hook is connected, said keeper having a side on each side of said hook, and means connected to the sides of said keeper for securing the keeper in place.

12. The combination, with a hook, comprising a base and a recurved end, of a keeper having an extension coöperating with the recurved end of the hook to provide therewith and with the bottom of the hook a retaining means for the article to which the hook is connected, said keeper having a side projection on each side of said hook, and means connecting said projection securing said keeper in place.

In testimony whereof, I hereunto affix my signature.

FRANK L. WEST.